(12) United States Patent
Way et al.

(10) Patent No.: US 9,044,715 B2
(45) Date of Patent: Jun. 2, 2015

(54) UNSUPPORTED PALLADIUM ALLOY MEMBRANES AND METHODS OF MAKING SAME

(75) Inventors: J. Douglas Way, Boulder, CO (US); Paul Thoen, Littleton, CO (US); Sabina K. Gade, Westminster, CO (US)

(73) Assignee: Colorado School of Mines, Golden, CO (US)

( * ) Notice: Subject to any disclaimer, the term of this patent is extended or adjusted under 35 U.S.C. 154(b) by 851 days.

(21) Appl. No.: 12/197,218

(22) Filed: Aug. 22, 2008

(65) Prior Publication Data

US 2009/0176012 A1    Jul. 9, 2009

Related U.S. Application Data

(60) Provisional application No. 60/957,170, filed on Aug. 22, 2007.

(51) Int. Cl.
| | |
|---|---|
| *B01D 71/02* | (2006.01) |
| *B01D 67/00* | (2006.01) |
| *C01B 3/50* | (2006.01) |
| *C23C 18/18* | (2006.01) |
| *C23C 18/38* | (2006.01) |
| *C23C 18/44* | (2006.01) |
| *C23C 18/16* | (2006.01) |

(52) U.S. Cl.
CPC .......... *B01D 71/022* (2013.01); *B01D 67/0069* (2013.01); *C01B 3/505* (2013.01); *C23C 18/1605* (2013.01); *C23C 18/1651* (2013.01); *C23C 18/1657* (2013.01); *C23C 18/1692* (2013.01); *C23C 18/1841* (2013.01); *C23C 18/38* (2013.01); *C23C 18/44* (2013.01); *B01D 2325/20* (2013.01)

(58) Field of Classification Search
USPC ........................................ 428/457; 427/383.1
IPC ............... B22F 1/025; C23C 18/1692,18/1651, C23C 18/1657
See application file for complete search history.

(56) References Cited

U.S. PATENT DOCUMENTS

| | | | |
|---|---|---|---|
| 2,773,561 A | 12/1956 | Hunter | |
| 3,155,467 A | 11/1964 | Yamamoto et al. | |
| 3,350,845 A | 11/1967 | McKinely | |

(Continued)

FOREIGN PATENT DOCUMENTS

| | | |
|---|---|---|
| EP | 0783919 | 7/1997 |
| EP | 1096026 | 5/2001 |

(Continued)

OTHER PUBLICATIONS

Zhao et al. ("Preparation of palladium composite membranes by modified electroless plating procedure", Journal of Membrane Science 142 (1998) 147-157).*

(Continued)

*Primary Examiner* — Weiping Zhu
(74) *Attorney, Agent, or Firm* — Sheridan Ross P.C.

(57) ABSTRACT

The invention provides support-free palladium membranes and methods of making these membranes. Single-gas testing of the unsupported foils produced hydrogen permeabilities equivalent to thicker membranes produced by cold-rolling. Defect-free films as thin as 7.2 microns can be fabricated, with ideal $H_2/N_2$ selectivities as high as 40,000. Homogeneous membrane compositions may also be produced using these methods.

20 Claims, 11 Drawing Sheets

(56) References Cited

U.S. PATENT DOCUMENTS

| | | | |
|---|---|---|---|
| 3,439,474 | A | 4/1969 | McKinely |
| 3,556,955 | A * | 1/1971 | Ancker et al. ............... 205/167 |
| 3,849,076 | A | 11/1974 | Gryaznov et al. |
| 3,881,891 | A | 5/1975 | Goltsov et al. |
| 4,179,470 | A | 12/1979 | Mischenko et al. |
| 4,313,013 | A | 1/1982 | Harris |
| 4,343,013 | A | 8/1982 | Bader et al. |
| 4,496,373 | A | 1/1985 | Behr et al. |
| 4,911,803 | A | 3/1990 | Kunz |
| 5,139,541 | A | 8/1992 | Edlund |
| 5,149,420 | A | 9/1992 | Buxbaum et al. |
| 5,215,729 | A | 6/1993 | Buxbaum |
| 5,451,386 | A | 9/1995 | Collins et al. |
| 5,498,278 | A | 3/1996 | Edlund |
| 5,518,053 | A | 5/1996 | Robison |
| 5,518,530 | A | 5/1996 | Sakai et al. |
| 5,645,626 | A | 7/1997 | Edlund et al. |
| 5,652,020 | A | 7/1997 | Collins et al. |
| 5,738,708 | A | 4/1998 | Peachey et al. |
| 5,888,273 | A | 3/1999 | Buxbaum |
| 5,904,754 | A | 5/1999 | Juda et al. |
| 5,931,987 | A | 8/1999 | Buxbaum |
| 5,980,989 | A | 11/1999 | Takahashi et al. |
| 5,997,594 | A | 12/1999 | Edlund et al. |
| 6,086,729 | A | 7/2000 | Bredesen et al. |
| 6,103,028 | A | 8/2000 | Juda et al. |
| 6,152,984 | A | 11/2000 | Drnevich |
| 6,152,987 | A | 11/2000 | Ma et al. |
| 6,152,995 | A | 11/2000 | Edlund |
| 6,168,650 | B1 | 1/2001 | Buxbaum |
| 6,171,574 | B1 | 1/2001 | Juda et al. |
| 6,183,543 | B1 | 2/2001 | Buxbuam |
| 6,214,090 | B1 | 4/2001 | Dye et al. |
| 6,221,117 | B1 | 4/2001 | Edlund et al. |
| 6,238,465 | B1 | 5/2001 | Juda et al. |
| 6,267,801 | B1 | 7/2001 | Baake et al. |
| 6,319,306 | B1 | 11/2001 | Edlund et al. |
| 6,372,363 | B1 | 4/2002 | Krueger |
| 6,375,906 | B1 | 4/2002 | Edlund et al. |
| 6,376,113 | B1 | 4/2002 | Edlund et al. |
| 6,383,670 | B1 | 5/2002 | Edlund et al. |
| 6,416,729 | B1 | 7/2002 | DeBerry et al. |
| 6,419,728 | B1 | 7/2002 | Edlund |
| 6,451,464 | B1 | 9/2002 | Edlund et al. |
| 6,458,189 | B1 | 10/2002 | Edlund et al. |
| 6,461,408 | B2 | 10/2002 | Buxbaum |
| 6,465,118 | B1 | 10/2002 | Dickman et al. |
| 6,494,937 | B1 | 12/2002 | Edlund et al. |
| 6,495,227 | B1 | 12/2002 | Cahuzac |
| 6,537,352 | B2 | 3/2003 | Edlund et al. |
| 6,540,813 | B2 | 4/2003 | Nelson et al. |
| 6,541,676 | B1 | 4/2003 | Franz et al. |
| 6,562,111 | B2 | 5/2003 | Edlund et al. |
| 6,569,227 | B2 | 5/2003 | Edlund et al. |
| 6,576,350 | B2 | 6/2003 | Buxbaum |
| 6,596,057 | B2 | 7/2003 | Edlund et al. |
| 6,649,291 | B1 | 11/2003 | Iijima et al. |
| 6,649,559 | B2 | 11/2003 | Drost et al. |
| 6,761,929 | B2 | 7/2004 | Damle |
| 6,916,454 | B2 | 7/2005 | Alvin |
| 7,108,935 | B2 | 9/2006 | Bauer et al. |
| 7,749,305 | B1 | 7/2010 | Bossard et al. |
| 8,163,064 | B2 | 4/2012 | Bredesen et al. |
| 2003/0190486 | A1 | 10/2003 | Roa |
| 2004/0244583 | A1 | 12/2004 | Ma et al. |
| 2005/0109609 | A1* | 5/2005 | Rei et al. ............... 204/192.15 |
| 2005/0147859 | A1 | 7/2005 | Kiefer et al. |
| 2005/0249975 | A1 | 11/2005 | Sandberg et al. |
| 2006/0093848 | A1 | 5/2006 | Senkevich et al. |
| 2006/0188737 | A1* | 8/2006 | Roa et al. ............... 428/469 |
| 2008/0038567 | A1* | 2/2008 | Way et al. ............... 428/457 |
| 2008/0210088 | A1 | 9/2008 | Pledger |
| 2009/0000480 | A1 | 1/2009 | Dardas et al. |
| 2010/0092353 | A1 | 4/2010 | Noda |
| 2012/0012004 | A1 | 1/2012 | Way et al. |

FOREIGN PATENT DOCUMENTS

| | | |
|---|---|---|
| JP | 63-295402 | 1/1988 |
| JP | 63-294925 | 12/1988 |
| JP | 8-266876 | 10/1996 |
| JP | 9-029079 | 2/1997 |
| JP | 10-203802 | 8/1998 |
| WO | WO 01/53005 | 7/2001 |
| WO | WO 2006/031080 | 3/2006 |

OTHER PUBLICATIONS

Rodman et al. ("Studies of the oxidation of palladium complexes by the advanced oxidation process pretreatment of model catalysts for precious metal analysis", Talanta 70 (2006) 426-431).*

Aggarwal, et al., "Spontaneous Ordering of Oxide Nanostructures", Science, Mar. 24, 2000, Voil. 287, pp. 2235-2237.

Alefeld, et al., (eds), Hydrogen in Metals I: Basic Properties, 1978, pp. 324-326, 342-348, Springer-Verlag, Berlin, Germany.

Ali, et al. "Irreversible Poisoning of Pd—Ag Membranes", International Journal of Hydrogen Energy, 1994, vol. 19, No. 11, pp. 877-880, Elsevier Science Ltd., London, UK.

Amandusson, et al., "The effect of CO and $O_2$ on hydrogen permeation through a palladium membrane", Applied Surface Science, 2000, vol. 153, pp. 259-267.

Armor "Applications of Catalytic Inorganic Membrane Reactors to Refinery Products", Journal of Membrane Science, 1998, vol. 147, pp. 217-233, Elsevier Science B.V., Amsterdam, The Netherlands.

Armor, "Membrane Catalysis: Where Is It Now, What Needs to Be Done?", Catalysis Today, 1995, vol. 25, pp. 199-207, Elsevier Science B.V., Amsterdam, The Netherlands.

Barbieri, et al. "Methane Steam Reforming Analysis in a Palladium-Based Catalytic Membrane Reactor", Industrial & Engineering Chemistry Research, 1997, vol. 36, pp. 3396-3374, American Chemical Society, Washington, DC, USA.

Benesi, et al. "Preparation of Highly Dispersed Catalytic Metals: Platinum Supported on Silica Gel", Journal of Catalyis, 1968, vol. 10, pp. 328-335, Academic Press, London, UK.

Berseneva, et al., "Alloys of Palladium With Metals of the Platinum Group as Hydrogen-Permeable Membrane components at High Temperature of Gas Separation", International Journal of Hydrogen Energy, 1993, vol. 18, No. 1, pp. 15-18, Pergamon Press Ltd., Great Britian.

Brey, et al., "Hydrogen as an energy carrier and its production by nuclear power", International Atomic Energy Agency, 1999, IAEA-TECDOC-1085, Vienna Austria, pp. 1-348.

Buxbaum, et al., "Hydrogen Transport Through Tubular Membranes of Palladium-Coated Tantalum and Niobium", Industrial & Engineering Chemistry Research, 1996, vol. 35, pp. 530-537, American Chemical Society, Washington, DC, USA.

Collins, et al., "Catalytic Dehydrogenation of Propane in Hydrogen Permselective Membrane Reactors", Industrial & Engineering Chemistry Research, 1996, vol. 35,pp. 4398-4405, American Chemical Society, Washington, DC, USA.

Collins, et al., "Preparation of Characterization of a Composite Palladium-Ceramic Membrane", Industrial & Engineering Chemistry Research, 1993, vol. 32, pp. 3006-3013, American Chemical Society, Washington, DC, USA.

Criscuoli, et al., "An Economic Feasibility Study for Water Gas Shift Membrane Reactor", Journal of Membrane Science, 2001, vol. 181, pp. 21-27, Elsevier Science B.V., Amsterdam, The Netherlands.

Dolan, et al., Composition and operation of hydrogen-selective amorphous alloy membranes, Journal of Membrane Science, 2006, vol. 285, pp. 30-55.

Dorling, et al., "The Structure and Activity of Supported Metal Catalysts", Journal of Catalysis, 1971, vol. 20, pp. 190-201, Academic Press, London, UK.

Doyle, et al., "The Influence of intercrystalline defects on hydrogen activity and transport in nickel", Acta Metallurgica et Materialia, 1995, vol. 43, No. 8, pp. 3027-3033.

Edlund, "A Membrane Reactor for H2S Decomposition", FETC 1996 Conference Proceedings: Advanced Coal-Fired Power Systems (56) References Cited

OTHER PUBLICATIONS

'96 Review Meeting, Morgantown, West Virginia, Jul. 16-18, 1996, pp. 1-9, U.S. Department of Energy, Office of Fossil Energy, USA.
Fisher, et al. "Psolution of Hydrogen in Palladium/Copper Alloys", Journal of Solid State Chemistry, 1977, vol. 20, pp. 149-158, Academic Press Inc., Great Britain.
Flanagan, et al., "Solubility of Hydrogen (1 atm, 298 K) in Some Copper/Palladium Alloys", Solid State Communications, 1975, vol. 16, pp. 529-532, Pergamon Press, Great Britain.
Foley, et al."Effect of a Model Hydrogenation on a Catalytic Palladium Membrane", Selectivity in Catalysis, 1993, pp. 168-184, American Chemical Society—published by Oxford University Press, UK.
Foo "Chapter 4: Preparation and Characterization of a Composite Palladium—Gold Ceramic Membrane" and "Chapter 5: Conclusions and Recommendations", Hydrogen Separation in Palladium Ceramic Membranes and Palladium—Gold Ceramic Membranes, 1995, pp. 71-90, Colorado School of Mines, Golden, USA.
Gade, et al., "Fabrication of Unsupported Palladium-Alloy Dfilms by Electroless Plating", Prepr. Pap.-Am. Chem. Soc., Div. Fuel Chem. 2007, vol. 52, No. 2, pp. 661-662.
Gade, et al., "Unsupported palladium allow foil membranes fabricated by electroless plating", Journal of Membrane Science, 2008, vol. 316, pp. 112-118.
Grashoff, et al. "The Purification of Hydrogen—a Review of the Technology Emphasising the Current Status of Palladium Membrane Diffusion", Platinum Metals Review, 1982, pp. 157-169, Johnson Matthey PLC, London, UK.
Gryaznov et al., "Hydrogen Permeability of Some Metallopolymer Membranes", Polymer Science, 1993, vol. 35, No. 3, pp. 365-368, Russian Academy of Sciences, Moscow, Russia.
Gryaznov, et al. "Palladium—Ruthenium Alloys as Membrane Catalysts", Dokl. Akad. Nauk SSSR, Jul. 1973, pp. 604-606, Russian Academy of Sciences, Moscow, Russia.
Gryaznov, "Membrane Catalysis", Catalysis Today, 1999, vol. 51, pp. 391-395, Elsevier Science B.V., Amsterdam, The Netherlands.
Hollein, et al., "Preparation and characterization of palladium composite membranes for hydrogen removal in hydrocarbon dehydrogenation membranes reactors", Catalysis Today, 2001, vol. 67, pp. 33-42.
Hughes, et al., "A Comparative Study of Hydrogen Permeabilities and Solubilities in Some Palladium Solid Solution Alloys", Journal of Less-Common Metals, 1978, vol. 61, pp. P9-P21, Elsevier Sequois A.A., Lausanne, The Netherlands.
Hunter, "A New Hydrogen Purification Process", Platinum Metals Review, 1960, vol. 4, pp. 130-131, Johnson Matthey PLC, London, UK.
Jayaraman, et al., "Fabrication of Ultrathin Mettalic Membranes on Ceramic Supports by Sputter Deposition", Journal of Membrane Science, 1995, vol. 99, pp. 89-100, Elsevier Science B.V., Amsterdam, The Netherlands.
Kajiwara, et al., "Hydrogen Permeation Properties Through Composite Membranes of Platinum Supported on Porous Alumina", Catalysis Today, 2000, vol. 56, pp. 65-73, Elsevier Science B.V., Amsterdam, The Netherlands.
Karavanov, et al.,"Hydrogenation of Acetylenic and Ethylenic Alcohols in the Liquid Phase on Membrane Catalysts Consisting of Binary Alloys of Palladium With Nickel and Ruthenium", Kinet. Catal., 1984, vol. 25, pp. 56-60, Plenum Publishing Corporation, New York, USA.
Karpova, et al., "Sorption of Hydrogen by Disperse Palladium—Copper Alloys", Russ. J. Phys. Chem., 1959, vol. 33, No. 6, pp. 1393-1400, Leningrad (English summary at end of article).
Kueler, et al., "Characterization of electroless plated palladium—silver alloy membranes", Thin Solid Films, 1999, vol. 347, pp. 91-98.
Keuler, et al., "Characterising Palladium—Silver and Palladium—Nickel Alloy Membranes Using SEM, XRD and PIXE", Nuclear Instruments and Methods in Physics Research, 1999, B 158, pp. 378-382, Elsevier Science B.V., Amsterdam, The Netherlands.

Keuler, et al., "Developing a heating procedure to optimise hydrogen permeance through Pd—Ag membranes of thickness less than 2.2μm", Journal of Membrane Science, 2002, vol. 195, pp. 203-213.
Kikuchi, et al., "Preparation of Supported Thin Palladium—Silver Alloy Membranes and Their Characteristics for Hydrogen Separation", Gas Separation & Purification, 1991, vol. 5, pp. 261-266, Butterworth-Heineman Ltd., USA.
Knapton, "Palladium Alloys for Hydrogen Diffusion Membranes", Platinum Metals Review, 1977, vol. 21, pp. 44-50, Johnson Matthey PLC, London, UK.
Koppel, et al., "A Fuel Cell Primer: The Promise and the Pitfalls", Sep. 15, 2000, Rev. 4, pp. 1-31.
Kajiwara, et al., "Stability and hydrogen permeation behavior of supported platinum membranes in presence of hydrogen sulfide", International Journal of Hydrogen Energy, 1999, vol. 24, p. 839-844.
Kulprathipanja, et al., Pd and Pd—Cu membranes: Inhibition of $h_2$ permeation by $H_2S$, Journal of Membrane Science, 2005, vol. 254, pp. 49-62.
Lemier, et al., "Grain boundary segregation, stress and stretch: Effects on hydrogen absorption in nanocrystalline palladium", Acta Materialia, 2007, vol. 55, pp. 1241-1254.
Lewis, The Palladium Hydrogen System, 1967, pp. 70-71, 78-79, 82-85, 116-117, and 144-145, Academic Press, London, UK.
Li, et al., "Preparation of Pd/Ceramic Composite Membrane 1. Improvement of the Conventional Preparation Technique", Journal of Membrane Science, 1996, vol. 110, pp. 257-260, Elsevier Science B.V., Amsterdam, The Netherlands.
Li, et al, The effect of carbon monoxide and steam on the hydrogen permeability of a Pd/stainless steel membrane, Journal of Membrane Science, 2000, vol. 165, pp. 135-141.
McCool, et al., "Composition Control and Hydrogen Permeation Characteristics of Suptter Deposited Palladium—Silver Membranes", Journal of Membrane Science, 1999, vol. 161, pp. 67-76, Elsevier Science B.B., The Netherlands.
Morreale, et al., "Effect of hydrogen—sulfide on the hydrogen permeance of palladium—copper alloys at elevated temperatures", Journal of Membrane Science, 2004, vol. 241, pp. 219-224.
Morreale, et al., "The Permeability of Hydrogen in Bulk Palladium at Elevated Temperatures and Pressures", Journal of Membrane Science, 2003, vol. 212, pp. 87-97.
Nam, et al., "Hydrogen Separation by Pd Alloy Composite Membranes: Introduction of Diffusion Barrier", Journal of Membrane Science, 2001, vol. 192, pp. 177-185, Elsevier Science B.V., Amsterdam, The Netherlands.
Nam, et al.,"Preparation of a Palladium Alloy Composite Membrane Supported in a Porous Stainless Steel by Vacuum Electrodeposition," Journal of Membrane Science, Jan. 10, 1999, vol. 153, No. 2, pp. 163-173, Elsevier Science, B.V., United Kingdom.
Paglieri, et al.,"A New Preparation Technique for Pd/Alumina Membranes with Enhanced High-Temperature Stability", Industrial & Engineering Chemistry Research, 1999, vol. 38, No. 5, pp. 1925-1936, American Chemical Society, Washington, DC, USA.
Paglieri, "Chapter 6: Preparation of Palladiium—Copper Alloy Membranes for Hydrogen Separation" and "Chapter 7: Conclusions" and "Chapter 8: Recommendations for Future Work", Palladium and Palladium—Copper Composite Membranes for Hydrogen Separation, 1999, pp. 119-146, Colorado School of Mines, Golden, USA.
Paglieri, et al., "Innovations in palladium membrane research", Separations and Purification Methods, 2002, vol. 31, No. 1, pp. 1-169.
Di Pascasio, et al., "$H_2$ plasma for hydrogen loading in Pd", Intermetallics, 2003, vol. 11, pp. 1345-1354.
Peachey, et al., "Composite Pd/Ta Metal Membranes for Hydrogen Separation", Journal of Membrane Science, 1996, vol. 111, pp. 123-133, Elsevier Science B.V., Amsterdam, The Netherlands.
Piper, "Diffusion of Hydrogen in Copper—Palladium Alloys", Journal of Applied Physics, 1966, vol. 37, No. 2, pp. 715-721, American Institute of Physics, New York, USA.
Roa, et al., "The Influence of Alloy Composition on the H2 Flux of Composite Pd—Cu Membranes", Desalination, 2002, vol. 147, pp. 411-416, Elsevier Science B.V., Amsterdam, The Netherlands.
Rodina, et al., "The Interaction of Hydrogen with Certain Palladium—Gold and Palladium—Silver—Gold Alloys", Russian Journal of Physical Chemistry, 1971, vol. 45, No. 5, pp. 621-623.

(56) References Cited

OTHER PUBLICATIONS

Roy, et al., "Economics and Simulation of Fluidized Bed Membrane Reforming", International Journal of Hydrogen Energy, 1998, vol. 23, No. 9, pp. 745-752, Elsevier Science Ltd., Great Britain.

Saracco, et al., "High-Temperature Membrane Reactors: Potential and Problems", Chemical Engineering Science, 1999, vol. 54, pp. 1997-2017, Elsevier Science Ltd., Oxford, UK.

Shu, et al., "Simultaneous Deposition of Pd and Ag on Porous Stainless Steel by Electroless Plating", Journal of Membrane Science, 1993, vol. 77, pp. 181-195, Elsevier Science Publishers B.V., Amsterdam, The Netherlands.

Subramanian, et al., "Cu—Pd (Copper—Palladium)", Binary Alloy Phase Diagrams, 1990, vol.s 1-3, pp. 947-948, ASM International, USA.

Thomas, et al., "Fuel Cells—Green Power", 1999, pp. 1-33, Los Alamos National Laboratory, Los Alamos, USA.

Uemiya, et al., "Hydrogen Permable Palladium—Silver Alloy Membrane Supported on Porous Ceramics", Journal of Membrane Science, 1991, vol. 56, pp. 315-325, Elsevier Science Publishers B.V, Amsterdam, The Netherlands.

Uemiya, et al., "Separation of Hydrogen Through Palladium Thin Film Supported on a Porous Glass Tub", Journal of Membrane Science, 1991, vol. 56, pp. 303-313, Elsevier Science Publishers B.V., Amsterdam, The Netherlands.

Uemiya, "State-of-the-Art of Supported Metal Membranes for Gas Separation", Separation and Purification Methods, 1999, vol. 28, No. 1, pp. 51-85, Marcel Dekker, Inc., New York, USA.

Van Swaay, et al., "Permeability and Diffusion on Hydrogen Through Palladium", Transactions of the Metallurgical Society of AIME, Apr. 1960, vol. 218, pp. 285-289, The Metallurgical Society of AIME, USA.

Wu, et al., "Preparation of a Palladium Composite Membrane by an Inproved Electroless Plating Technique", Industrial & Engineering Chemistry Research, 2000, vol. 39, pp. 342-348, American Chemical Society, Washington, DC, USA.

Xomeritakis, et al., "Fabrication of Thin Metallic Membranes by MOCVD and Sputtering", Journal of Membrane Science, 1997, vol. 133, pp. 217-230, Elsevier Science B.V., Amsterdam, The Netherlands.

Yeung, et al., "Novel Preparation of Pd/Vycor Composite Membranes", Catalysis Today, 1995, pp. 231-236, 25, Elsevier Science B.V., Amsterdam, The Netherlands.

Yeung, et al., "Novel Preparation Techniques for Thin Metal-Ceramic Composite membranes", AIChE Journal, Sep. 1995, vol. 41, No. 9, pp. 2131-2139, American Institute of Chemical Engineers, New York, USA.

Zetkin, et al., "Diffusion and Penetrability of Deuterium in the Alloy Pd-53 at % Cu", Sov. Phys. Solid State, 1992, vol. 34, No. 1, pp. 83-85, American Institute of Physics, New York, USA.

Zetkin, et al., "Influence of Structural Transformations on the Diffusion Parameters of Deuterium in Palladium—Copper Alloys", Phys. Met. Metall., 1987, vol. 64, No. 5, pp. 130-134, Pergamon Press PLC, Poland.

Zhang, et al., "High Temperature PEM Fuel Cells", Journal of Power Sources, 2006, vol. 160, pp. 872-891.

Zhao, et al., "Preparation and characterization of palladium-based composite membranes by electroless plating and magnetron sputtering", Catalysis Today, 2000, vol. 56, pp. 89-96.

Cheng et al., "Effects of electroless plating chemistry on the synthesis of palladium membranes," Journal of Membranes, 2001, vol. 182, pp. 195-203.

U.S. Appl. No. 13/356,410, filed Jan. 23, 2012, Way et al.

Gade et al. "Palladium—ruthenium membranes for hydrogen separation fabricated by electroless co-deposition," International Journal of Hydrogen Energy, 2009, vol. 34, pp. 6484-6491.

Nam et al., "Methane steam reforming in a Pd-Ru membrane reactor," Korean Journal of Chemical Engineering, 2000, vol. 17, Iss. 3, pp. 288-291. (Abstract only).

Uemiya et al., "Palladium—Rhodium Alloy Membrane Fabricated Using Electroless Plating Technique and Its Hydrogen Permeance," Journal of the Japan Institute of Metals and Materials, 2007, vol. 71, No. 9, pp. 736-741.

\* cited by examiner

UNSUPPORTED PALLADIUM ALLOY MEMBRANES AND METHODS OF MAKING SAME

CROSS REFERENCE TO RELATED APPLICATION

This application claims the benefit of priority under 35 U.S.C. §119(e) to U.S. Provisional Patent Application Ser. No. 60/957,170 filed Aug. 22, 2007, which is incorporated herein by reference.

GOVERNMENT INTEREST

This invention was made with Government support under grant number DE-FG26-03NT41792 awarded by the U.S. Department of Energy's NETL University Coal Research Program and grant number DE-GF03-93ER14363 awarded by the U.S. Department of Energy's Office of Science, division of Basic Energy Sciences. The Government has certain rights in this invention.

FIELD OF INVENTION

The invention relates to unsupported defect-free palladium and palladium alloy foils and cost-effective and efficient methods of making these foils.

BACKGROUND OF INVENTION

The recent emphasis on cleaner energy technologies has focused new attention on hydrogen as an alternative fuel, especially for use in proton exchange membrane (PEM) fuel cells. Currently, most hydrogen worldwide is produced from hydrocarbon sources such as natural gas, oil, and coal, with only 4% originating from water electrolysis. Hydrogen produced from these sources will contain residual hydrocarbons, carbon monoxide and sulfur compounds, all of which can rapidly poison the PEM catalyst in concentrations as low as 10 ppm. An economic way to remove contaminants from hydrogen is therefore desirable. Membrane separation technologies have the potential to reduce operating costs, minimize unit operations, and lower energy consumption. Dense membranes made of palladium, nickel, platinum, and the metallic elements in groups III-V of the periodic table are able to transport hydrogen in a dissociated form, and are thus capable of theoretically infinite selectivity. Palladium membranes are of particular note for their high permeability, tolerance to hydrocarbon-containing streams, and their ability to self-catalyze the $H_2$ dissociation reaction.

The commercial application of palladium membranes has been limited by several factors. Pure palladium undergoes an embrittling hydride phase transition when exposed to hydrogen at temperatures below 300° C. Furthermore, it is subject to deactivation by carbon compounds at temperatures above 450° C. and irreversible poisoning by sulfur compounds. Additionally, the cost of commercial palladium foils (particularly those greater than 25 microns in thickness) is high. Because a successful membrane requires a lifetime on the order of several years under operating conditions, these concerns must be addressed.

Figure 1:
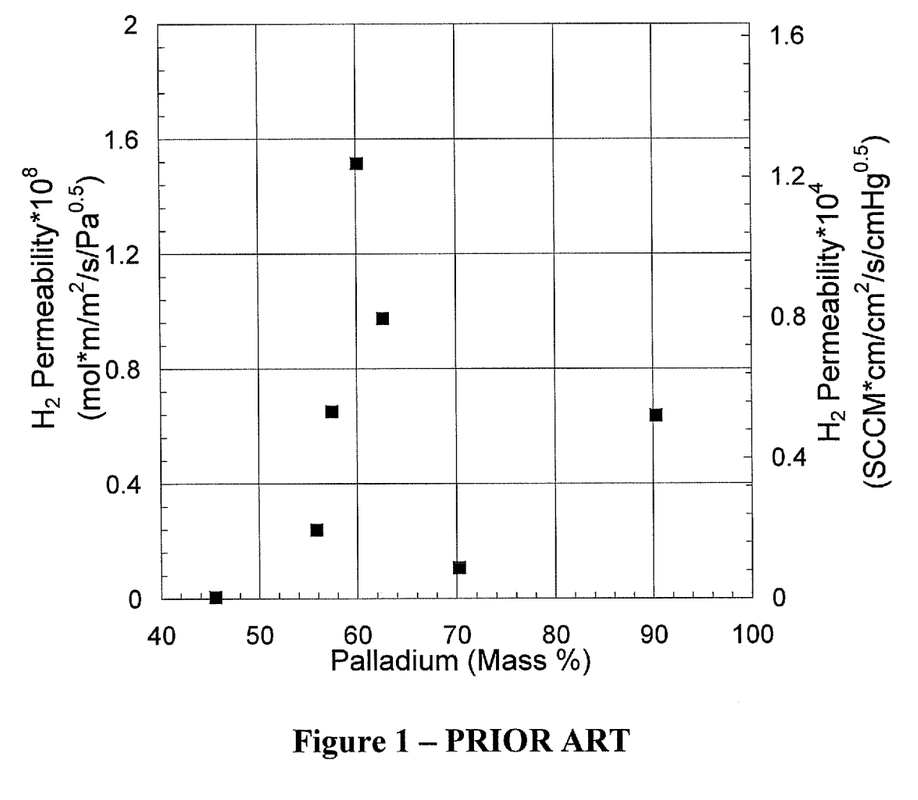
FIG. 1 shows the effect of alloy composition for palladium-copper membranes on pure hydrogen permeability at 350° C. (from McKinley, U.S. Pat. No. 3,439,474).

In order to reduce poisoning and embrittlement issues, palladium can be alloyed with a variety of other metallic elements. Alloy membranes have been made with such materials as Ag, Au, Cu, Fe, Ni, Pt, and Y. As shown in FIG. 1, the pioneering work done by McKinley (U.S. Pat. No. 3,350,845, 1967; and U.S. Pat. No. 3,439,474, 1969) demonstrated that certain copper and gold alloys actually have higher $H_2$ permeability than pure palladium, are unaffected by thermal cycling, and have improved resistance to poisoning by hydrogen sulfide. In the case of PdCu, the membrane has a sharp peak in permeability at the 40 wt % Cu composition, requiring precisely controlled fabrication in order to maximize hydrogen throughput.

Palladium alloys are traditionally produced by cold working, which allows for highly precise composition control but requires costly equipment in order to produce foils of less than 25 microns thickness. Therefore a great deal of research has been dedicated to alternative methods of production such as electroless plating, electroplating, physical vapor deposition (PVD), and chemical vapor deposition (CVD). Of these, electroless plating is the most heavily researched since it requires minimal equipment, no exotic precursors, and can be performed on any appropriately activated surface. Alloys can be either coplated or sequentially plated and then alloyed by annealing.

In one typical fabrication strategy, Pd-alloy membranes are plated on porous support media in order to combine the high flux of a thin film with the mechanical strength of the support. The most common support materials are porous ceramic or sintered porous metal, the latter of which typically uses an oxide layer between the support and the membrane to prevent intermetallic diffusion. Membranes with a thickness less than one micron can be produced upon these porous supports. But in some applications it is desirable to retain the intrinsic material properties of the palladium support, such as composition, crystal structure, and gas sorption, without the influences of the support.

Therefore, there exists a need for free-standing palladium membranes capable of selectively transporting hydrogen gas in the absence of support media while withstanding temperature and pressure cycles encountered in typical applications in which hydrogen purification membranes are used, and well-controlled methods of efficiently and economically producing these membranes.

SUMMARY OF INVENTION

The invention provides free-standing palladium membranes that are thin, permeable to hydrogen and durable, as well as methods of making these membranes. These membranes have been tested for as long as 360 hours without observed increases in leak rates or decreases in permeability.

One embodiment is a method of forming a palladium membrane including the electroless plating of a support to form a palladium membrane on the support and removing the palladium membrane from the support to produce the free-standing palladium membranes of the invention. The support is seeded with metallic palladium crystallites prior to the electroless plating and this seeding may be accomplished by contacting the support with a solution of palladium acetate in an organic solvent. The palladium acetate may be decomposed prior to the electroless plating, for example by immersing the seeded support in a 3 wt % solution of hydrogen peroxide for about 30 minutes. The palladium acetate may also be reduced prior to electroless plating, for example, by contacting the support with hydrazine after the seeding for about 20 minutes at about 50° C.

In one embodiment, the support is a stainless steel support, and in a preferred embodiment the support is a mirror-finished stainless steel support.

In one embodiment, the electroless plating includes immersing the support in a palladium plating bath, and in a preferred embodiment, the palladium plating bath contains no ethylenediaminetetraacetic (EDTA). The electroless plating may include immersing the support in a palladium plating bath at about 50° C., and adding hydrazine to the plating bath. In a preferred embodiment, the hydrazine is a 3M solution of hydrazine added to the plating solution in a 100:1 ratio of plating bath to hydrazine. In another preferred embodiment, the electroless plating bath is agitated during the immersing.

The palladium film may be removed from the support by scoring the edge of the palladium film and lifting the film away from the support.

A second metal may be incorporated into or onto the palladium membrane by electroless plating of a second metal onto the palladium membrane to form a layered metal membrane before the palladium film is removed from the support. In a preferred embodiment, the second metal is copper, silver or gold. The additional metal membrane layers may be annealed with the palladium metal membrane prior to removing the film from the support, to form a homogenous metal membrane film.

DESCRIPTION OF EMBODIMENTS

The present invention is drawn to methods of making thin palladium membranes with high hydrogen permeabilities and free of porous support media. The invention provides a novel method for the production of thin (<25 micron) palladium films by an electroless plating processes. Using this technique, pure Pd films, as low as 7 μm in thickness, may be produced, with hydrogen permeabilities comparable to traditional cold-rolled foils and minimal leak rates. Additionally, palladium alloys can be applied to these films by sequential electroless plating, and annealed to produce highly-selective and hydrogen-permeable membranes.

The fabrication methods of the present invention include electroless plating of a support to form a palladium membrane on the support followed by removal of the palladium membrane from the support to produce a free-standing palladium foil membrane.

The support to be plated is first seeded with metallic palladium crystallites that catalyze the electroless plating reaction. In one embodiment, this seeding is accomplished by applying a solution of palladium acetate in an organic solvent to the support. Preferably, the organic solvent used is chloroform. Portions of the support that are outside the intended area of seeding are masked prior to application of the palladium acetate seed solution. The organic ligand applied to the support in the seed solution is then decomposed. In one embodiment, this decomposition is accomplished by immersing the seeded support in a 3 wt % solution of hydrogen peroxide. Typically, the decomposition of the ligand is conducted in a 3 wt % solution of hydrogen peroxide for about 30 minutes at room temperature. The treated surface may also be reduced. In one embodiment, this surface reduction is performed in a dilute solution of hydrazine for about 20 minutes, at about 50° C.

The support on which the membrane is plated must support the formation of the metallic palladium crystallites and may be highly polished to facilitate the removal of the palladium film that is formed through the electroless plating techniques. Preferably, the support is a stainless steel support. More preferably, the support is a mirror-finished stainless steel support. The support may be cut into pieces that are slightly larger than the desired final membrane size and thoroughly cleaned to remove any trace contaminants. The surfaces of the support that are not intended to be seeded for electroless plating (such as the unpolished areas of a mirror-finished stainless steel support) are masked.

After seeding the support, the support is plated by immersing the activated support in a palladium plating bath. The plating typically proceeds batchwise. Preferably, the plating bath contains no EDTA (ethylenediaminetetraacetic acid), which is a common stabilizing and complexing agent in palladium plating baths that remains in the membrane, producing carbon contamination and compromising palladium membrane performance. In one preferred embodiment, the plating is conducted by immersing the activated support in a palladium plating solution at about 50° C. followed by the addition of hydrazine to the plating bath. The hydrazine is preferably added as a 3M solution of hydrazine in a 100:1 ratio of plating bath to hydrazine. The bath may be agitated to prevent bubbles from adhering to the support which results in defects in the palladium film being formed.

The palladium foil formed in the electroless plating process is removed from the support to recover a thin palladium film free of the support. Palladium foil films formed on mirror-finished stainless steel supports using these processes are readily removed from the support. For example, simply scoring the edges of the palladium film allows the film to be lifted away from the mirror-finished side of a stainless steel support.

Additional metal layers may be plated onto the palladium membranes formed in these processes by subsequent rounds of electroless plating. In this manner, distinct heterogenous layers can be formed on the palladium films. Annealing of these layered metals can then be used to produce homogeneous palladium alloy compositions. Any metal that can be applied via this second electroless plating step can be used. Exemplary metals that form useful palladium alloys include copper, silver and gold.

Additional objects, advantages, and novel features of this invention will become apparent to those skilled in the art upon examination of the following examples, which are not intended to be limiting.

EXAMPLES

Example 1

Fabrication of a Palladium Membrane

Palladium membranes were synthesized on commercial mirror-finished 316-stainless steel supports (McMaster-Carr) of 0.003" thickness. The steel was cut into pieces slightly larger in area than the desired final membrane size and thoroughly cleaned with ethanol to remove trace contaminants. The unpolished side of the stainless steel was then masked, and the polished side lightly airbrushed with a solution of palladium acetate in chloroform. The support was then immersed in a 3 wt % solution of hydrogen peroxide for 30 minutes at room temperature to decompose the organic ligand, followed by reduction in a dilute solution of hydrazine for 20 minutes at 50° C.

A palladium plating bath was used that contained no EDTA, enhancing the stability of the finished product. Activating, reducing and plating bath recipes are presented in Table 1. The plating was done batchwise, immersing the activated support in the plating solution at 50° C. and adding 3.0 M hydrazine in a 100:1 ratio of plating bath to hydrazine. Mechanical agitation of the bath was used to prevent bubble adhesion and the resultant film defects.

TABLE 1

Activating, reducing, and plating bath recipes

| Solution | Component | Quantity |
|---|---|---|
| Activating | Palladium (II) Acetate, 99% pure | 3.3 g |
| | Chloroform, HPLC grade | 100 mL |
| Reducing | Deionized H$_2$O | 650 mL/L |
| | 28-30 wt % NH$_4$OH | 340 mL/L |
| | Hydrazine (3M) | 10 mL/L |
| Plating | Deionized H$_2$O | 602 mL/L |
| | 28-30 wt % NH$_4$OH | 392 mL/L |
| | 37 wt % HCl | 6 mL/L |
| | Palladium (II) Chloride, 99% pure | 5.5 g/L |

The palladium foils were removed from the support by scoring the edges with a blade, after which they could be readily separated from the stainless steel. Visual inspection for pinholes was performed, and any samples with flaws visible to the naked eye were not permeation tested.

Copper was plated onto these palladium films via a commercial plating bath (Technic CUPRO-T-Eco) after removal from the substrate and inspection for flaws. This technique produced heterogeneous layers of palladium and copper, and the resultant foils were annealed to produce homogeneous compositions.

Example 2

Testing the Palladium Membranes

Disc-shaped samples were cut from the plated membranes and mounted in stainless steel permeation cells with graphite gaskets. 0.2 micron Mott porous stainless steel discs supported the membranes, with Zircar alumina paper between the membrane and support to prevent intermetallic diffusion. This support configuration provides negligible mass transfer resistance for membranes of the thicknesses under consideration. The membranes were heated slowly under nitrogen to 673 K in order to prevent low-temperature hydrogen embrittlement. Hydrogen flow and nitrogen leak rate were then measured at varying feed pressures using soap film meters, leaving the permeate side at ambient pressure (approximately 82 kPa at Golden, Colo. altitude). If necessary, the membranes were purged with air to increase hydrogen permeability. All gases used were industrial grade (99.9% purity) or higher, and no sweep gases were used during permeation testing. All permeation experiments performed were single-gas, and therefore permeabilities and selectivities do not account for real-world mixture effects such as concentration polarization or competitive adsorption. When testing was completed, the membranes were slowly cooled under nitrogen and characterized using scanning electron microscopy with energy-dispersive X-ray spectroscopy (EDS). Phase determination of PdCu membranes was performed by X-ray diffraction, using monochromatic Cu—Kα X-rays with a wavelength of 1.54056 Å, a step size of 0.05°, and a count time of two seconds per step.

Pure Palladium Membranes

A single 20-minute plating cycle deposited a palladium layer with an average thickness of 1.25 microns, comparable to previous results using this bath to synthesize composite membranes. Membranes which underwent 8 or more cycles (equivalent to 10+ microns in thickness) were free from visible pinholes 100% of the time, while membranes between 7-10 microns were visually defect free only 65% of the time. No membranes less than seven microns in thickness were sufficiently defect-free and mechanically strong to withstand pressure testing.

Figure 2:
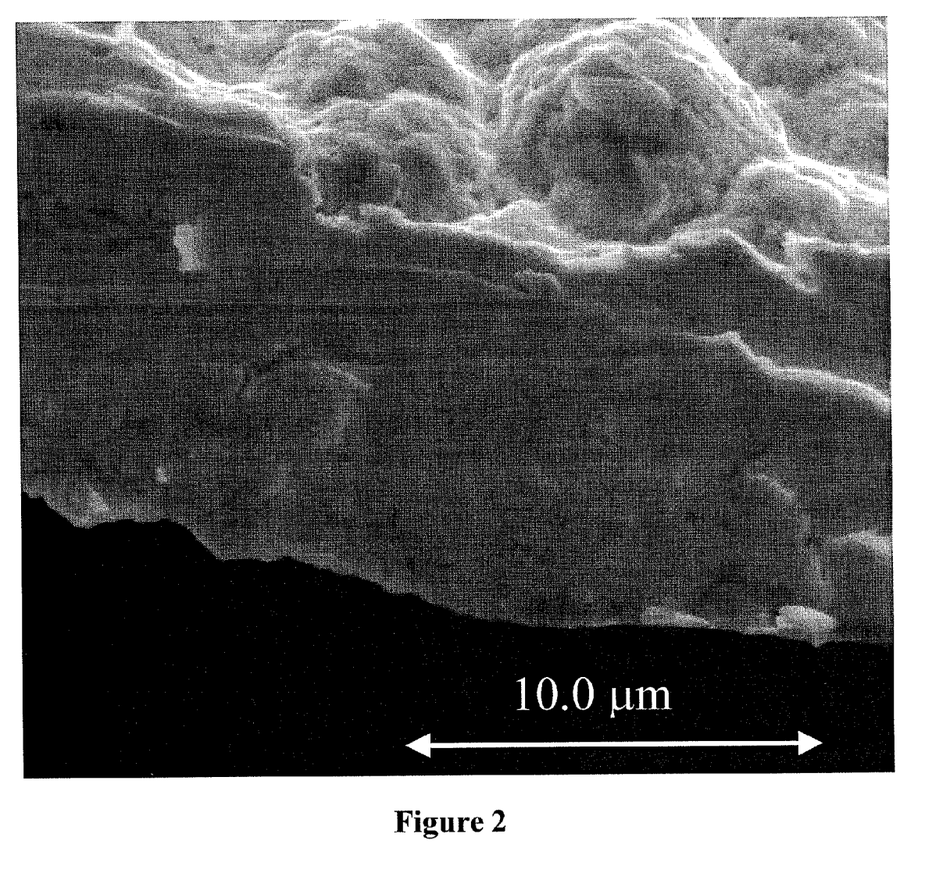
FIG. 2 shows a cross-sectional SEM micrograph of unsupported palladium membrane produced by electroless plating with mean thickness 9.6 microns.
Figure 3:
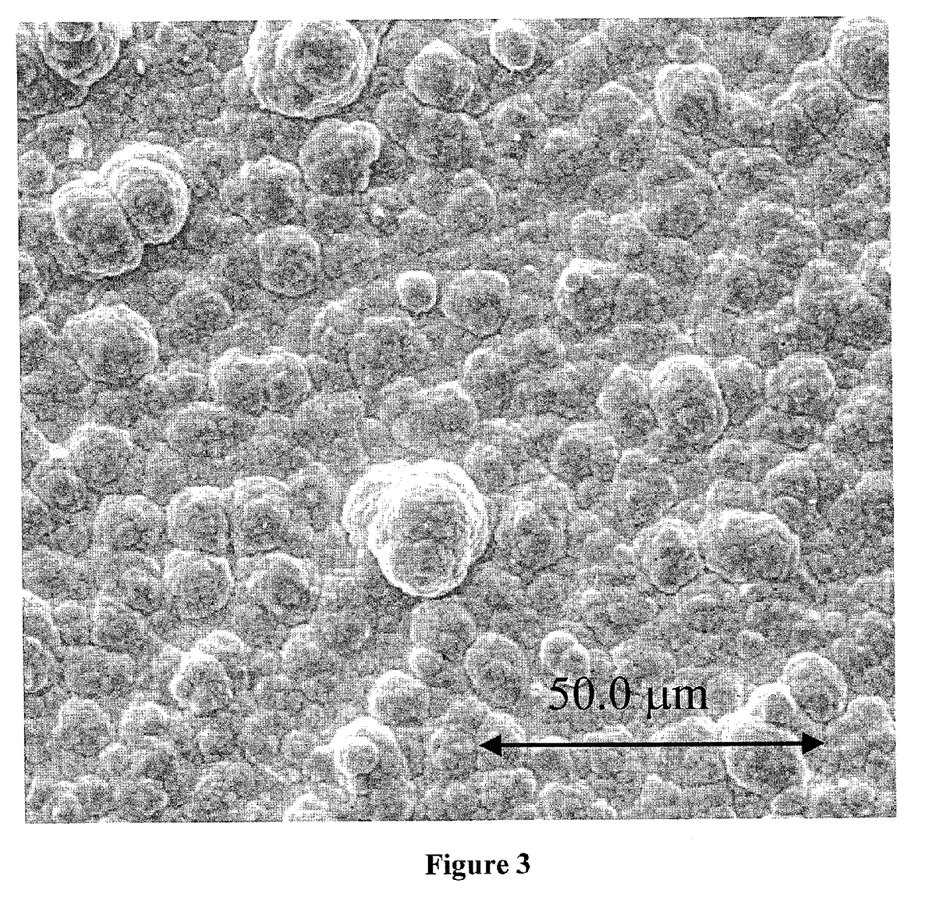
FIG. 3 shows a SEM micrograph of membrane surface (9.6 micron thick pure Pd), showing features of the surface exposed to the plating bath.
Figure 4:
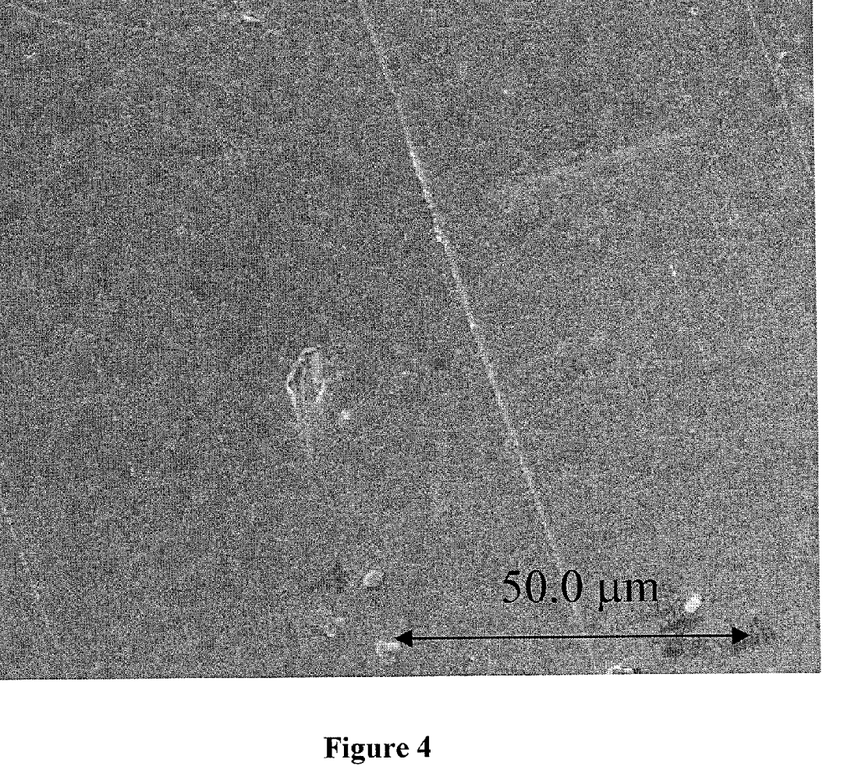
FIG. 4 shows a SEM micrograph of membrane surface (9.6 micron thick pure Pd), showing features of the surface nearest the support.

SEM analysis indicates that the films produced by this technique are very dense and uniform in cross-section (FIG. 2), with minimal porosity. The average thickness of a membrane was estimated by assuming a dense film, and extrapolating from the weight and area of the sample. The membrane topology is strongly dependent on the surface of the membrane examined: the bath side of the membrane is roughly textured, with many features larger than 10 microns in diameter (FIG. 3), whereas the surface adjacent to the support is smooth and has few features except for imprints of fine scratches from the stainless steel (FIG. 4). The high surface roughness of the bath side of the films is one advantage of the preparation methods of the present invention, as it provides increased surface area on which the hydrogen dissociation reaction may take place.

Figure 5:
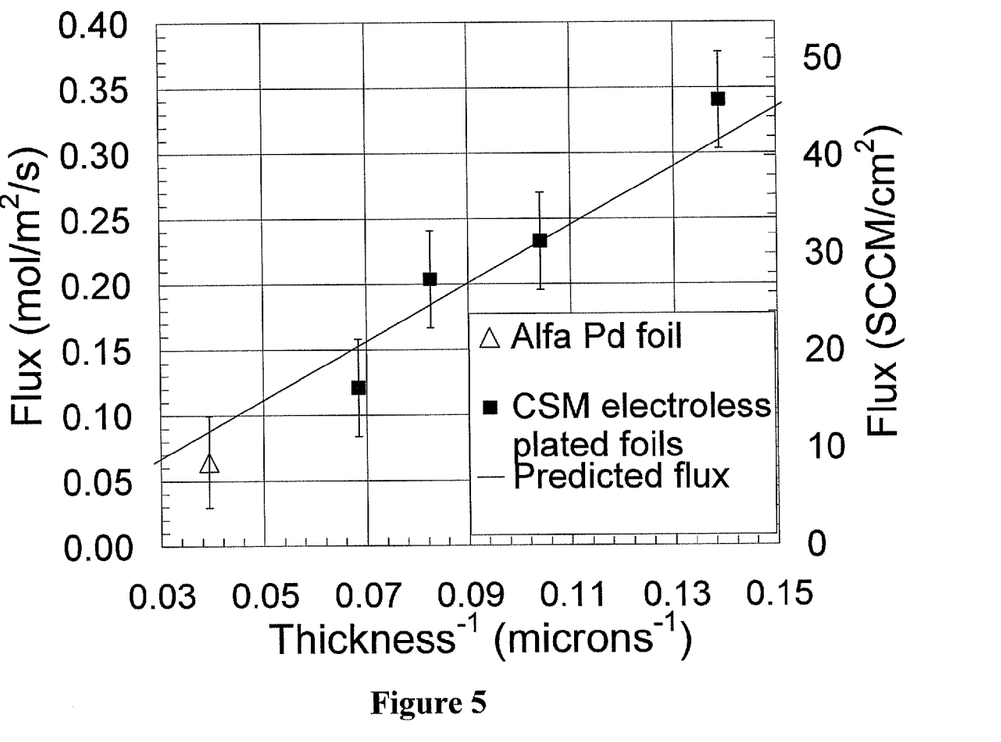
FIG. 5 shows the pure hydrogen flux as a function of inverse thickness for pure palladium membranes at 673K and 220 kPa feed pressure, both cold-rolled and electroless plated, with predicted flux calculated from literature values (Morreale et al., Permeability of Hydrogen in Bulk Palladium at Elevated Temperatures and Pressures, *J. Membrane Sci.*, 212:87 (2003)).

FIG. 5 summarizes the pure H$_2$ fluxes through pure Pd membranes as a function of inverse thickness at 673 K with a 220 kPa pressure gradient. After permeability had been maximized by air purges, the steady-state fluxes were compared to those predicted by literature, as well as to a commercial palladium foil of 25.4 microns in thickness (Alfa Aesar). The electroless plated foils had equivalent permeabilities to membranes made by more traditional methods. Additionally, the membranes were all highly selective, as shown by the date presented in Table 2.

TABLE 2

Hydrogen permeances, permeabilities, and ideal selectivities
for pure Pd membranes at 673 K, 220 kPa feed pressure

| Membrane Thickness (μm) | Pure $H_2$ Permeability * $10^8$ (mol/m/s/$Pa^{0.5}$) | Pure $H_2$ Permeance * $10^7$ (mol/$m^2$/s/Pa) | Ideal $H_2/N_2$ Selectivity |
|---|---|---|---|
| 7.2 | 1.22 ± 0.18 | 15.6 ± 0.2 | >40,000* |
| 9.6 | 1.34 ± 0.18 | 10.6 ± 0.2 | >30,000* |
| 12.1 | 1.35 ± 0.18 | 9.3 ± 0.2 | 172 ± 6 |
| 14.6 | 0.96 ± 0.18 | 5.5 ± 0.2 | 205 ± 14 |

*Selectivities are the ratios of pure gas permeances. Because our detection limit for leak rates is 0.001 SCCM, selectivities for undetectable leak rates are functions of hydrogen flux only, and thus higher for thinner films.

Figure 6:
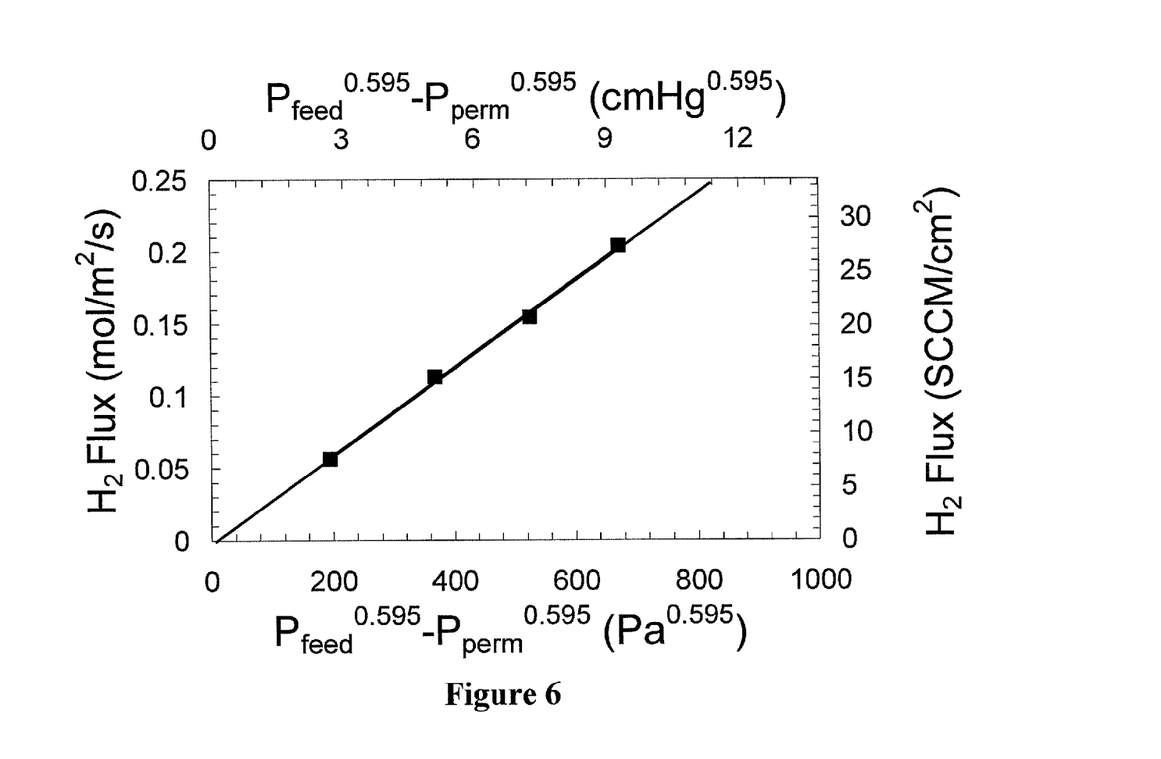
FIG. 6 shows the pure hydrogen flux as a function of partial pressure gradient at 673 K for a 12.1 micron palladium membrane.
Figure 7:
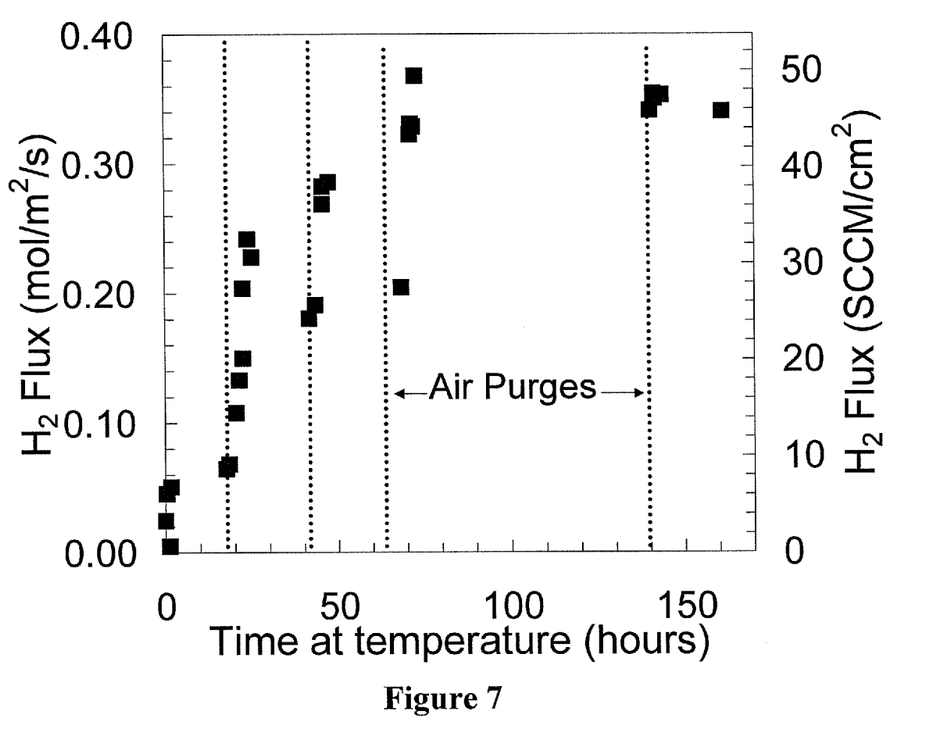
FIG. 7 shows the pure hydrogen flux as a function of time for a 7.2 micron pure palladium membrane at 673 K with a 220 kPa feed pressure.

FIG. 6 shows the pure $H_2$ flux as a function of partial pressure gradient at 673 K through a typical electroless-plated membrane that is 12.1 microns thick. The n-value of 0.595 suggests that the rate limiting step is the diffusion of dissociated hydrogen across the bulk of the film. The deviations from Sievert's law may be due to transport through defects in the palladium foil or through gaps in the graphite seals. As previous research on supported films has shown, in order to obtain maximum values for hydrogen permeability, the membranes must be exposed to air or other oxidizing atmospheres at operating temperature. These air purges appear to increase flux by cleaning the membrane surface and increasing surface roughness, although these two changes may not be sufficient to account for all the increase in flux. The electrolessly-plated free-standing foils also required air purging, despite their intrinsic surface roughness. In some cases, such as that shown in FIG. 7, multiple air exposures were necessary to maintain high hydrogen permeability.

Palladium-Copper Membranes

Figure 8:
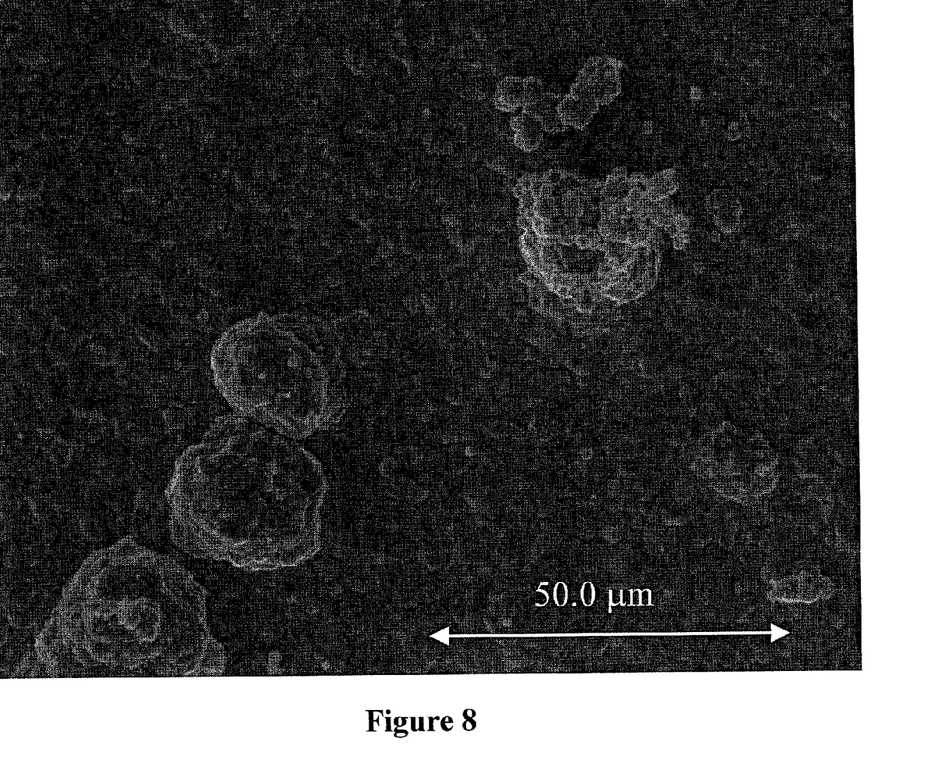
FIG. 8 shows a SEM micrograph of the surface of $Pd_{59}Cu_{41}$ electroless-plated unsupported membrane 16.7 microns thick prior to testing.
Figure 9:
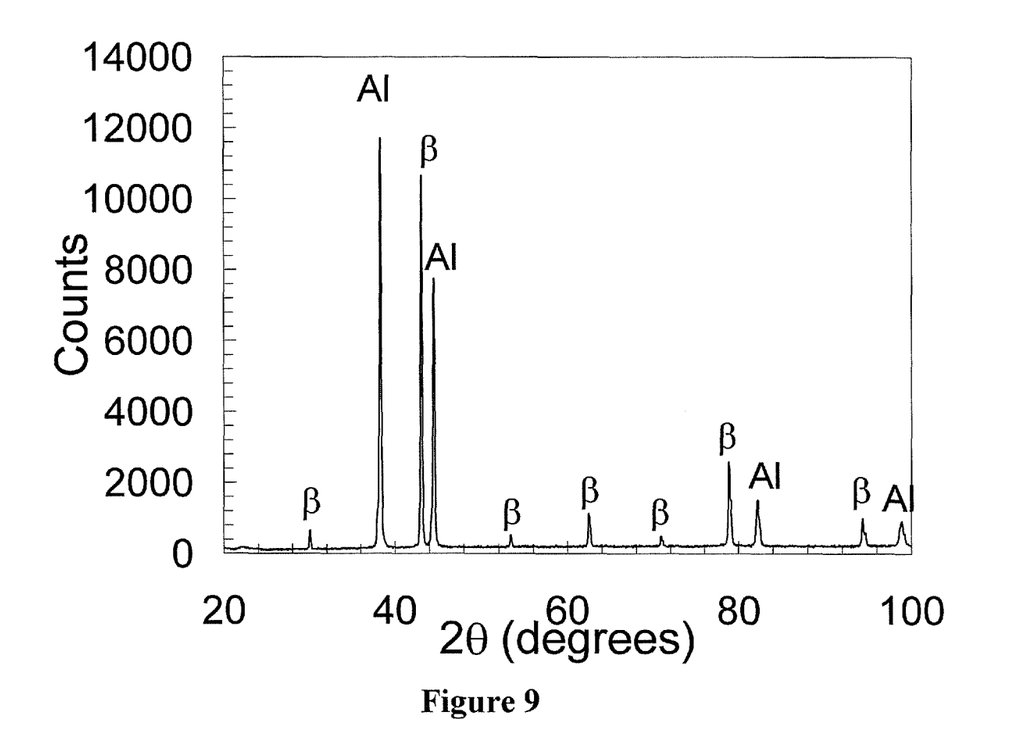
FIG. 9 shows an X-ray diffraction pattern for a fully annealed $Pd_{59}Cu_{41}$ membrane 16.7 microns thick showing the 13 (BCC) crystal phase. The source of the remaining peaks is the aluminum XRD sample holder.

Copper was applied to the palladium membrane after it was removed from the support. Because of this, both sides of the membrane were coated with copper and had similar morphologies, with pronounced surface features created by the plating process (FIG. 8). Composition was estimated by weight gain upon copper plating. The desired composition for PdCu membranes was 60% Pd by weight, and it was found that by varying the copper plating time, the composition could be controlled to within 2 wt % of this value. EDS and XRD were used on a membrane shown to have 41 wt % copper by weight gain in order to confirm accuracy. The X-ray diffraction pattern shown in FIG. 9 indicates the membrane is purely in the beta (BCC) crystal phase at ambient temperature after complete annealing, as would be expected from the phase diagram for a 41% Cu film. Quantitative EDS analysis confirmed the 41 wt % copper, although spot scans of the surface show as much as 3 wt % variation from location to location.

Figure 10:
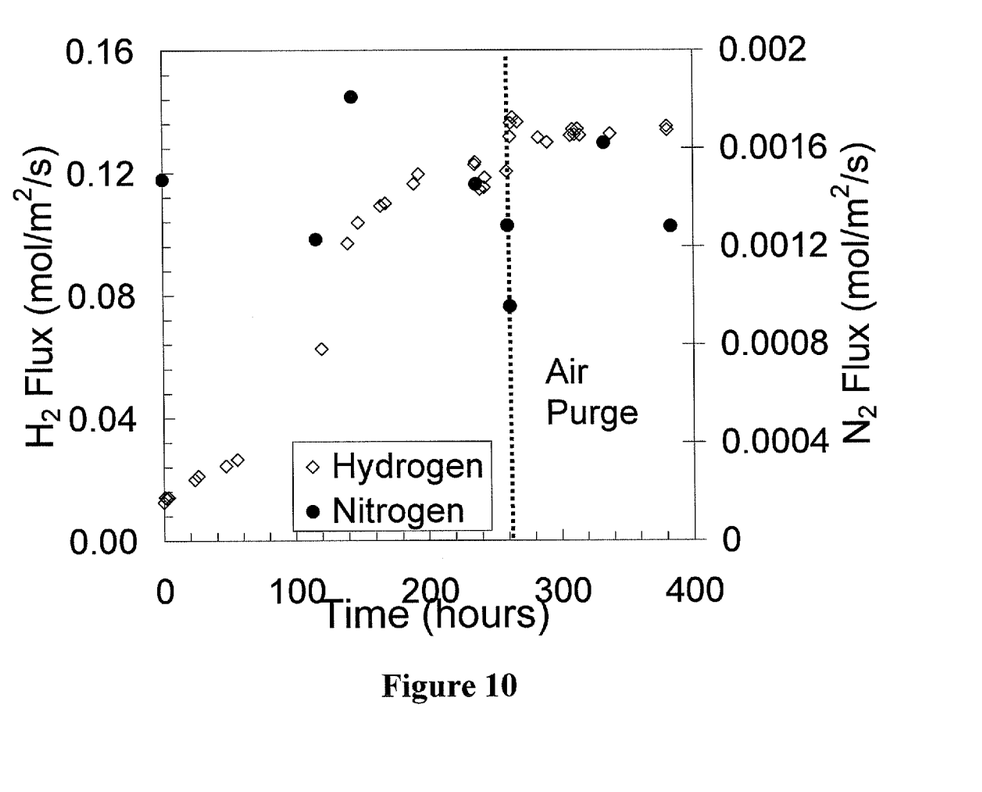
FIG. 10 shows pure gas hydrogen and nitrogen fluxes as a function of time for a $Pd_{59}Cu_{41}$ membrane 16.7 microns thick at 673 K and 220 kPa feed pressure.

The membrane was annealed in situ, taking upwards of 200 hours at 673 K and under hydrogen pressure to produce homogeneous alloys. As with the pure Pd membranes, the PdCu alloys require high temperature air exposure in order to maximize hydrogen permeability; however, the increase in permeability with air purge was slight in comparison to the non-alloy films. During a test of 360 hours duration including annealing and air exposure, the nitrogen leak rate did not increase significantly, with the ideal $H_2/N_2$ selectivity of the membrane being 105±5 (FIG. 10). This does not necessarily indicate that the T-Eco plating bath with its probable carbon contaminants produces stable films, as the membrane was not exposed to reformate or sulfur-containing streams. The fully annealed membrane had a leak-corrected hydrogen permeability at 673 K of $1.33 \times 10^{-8}$ mol-$m^{-1}$-$s^{-1}$-$Pa^{-0.5}$, in line with literature values for membranes of the predicted composition.

Figure 11:
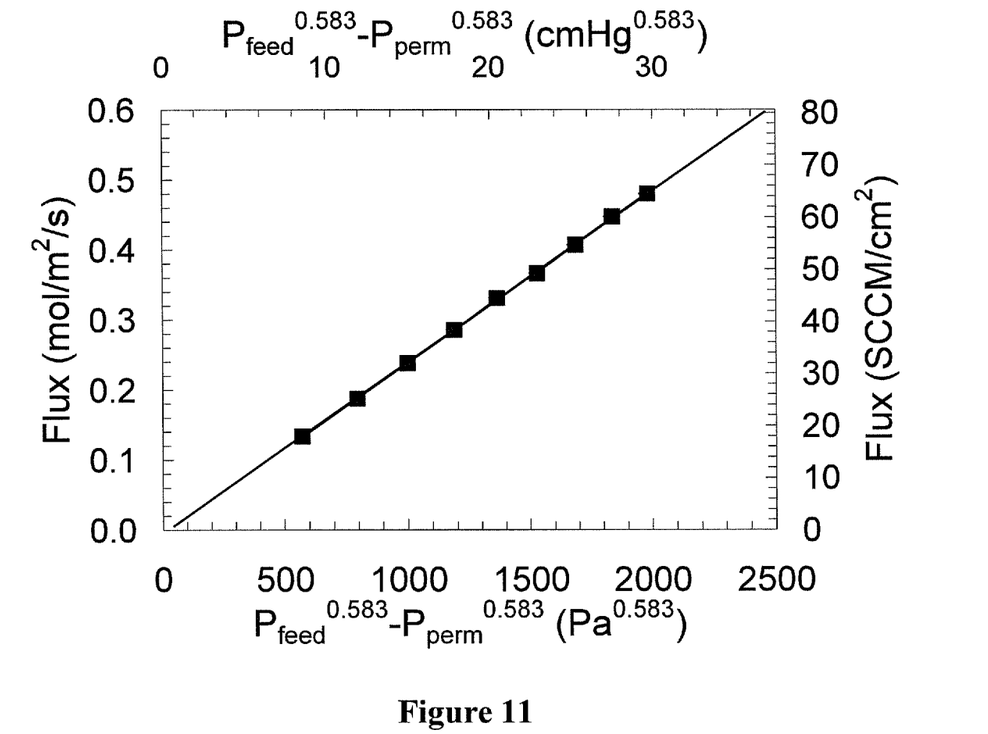
FIG. 11 shows pure hydrogen flux as a function of pressure gradient for a $Pd_{59}Cu_{41}$ membrane 16.7 microns thick at 673 K.

The "n-value" for the flux versus pressure gradient plot is 0.583 (FIG. 11), suggesting that there is minimal resistance to mass transfer by sorption, desorption, dissociation or recombination.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of forming a free-standing hydrogen permeable palladium membrane comprising:
   electroless plating of a surface of a support to form a palladium membrane on the support;
   intentionally removing the palladium membrane from the support to produce the free-standing hydrogen permeable palladium membrane; and
   plating the free-standing hydrogen permeable palladium membrane with a second metal.

2. The method of claim 1, wherein the support is seeded with metallic palladium crystallites prior to the electroless plating.

3. The method of claim 2, wherein the seeding comprises contacting the support with a solution of palladium acetate in an organic solvent.

4. The method of claim 2, further comprising decomposing the palladium acetate prior to the electroless plating.

5. The method of claim 4, wherein the decomposing comprise immersing the seeded support in a 3 wt % solution of hydrogen peroxide.

6. The method of claim 5, wherein the immersing is conducted for about 30 minutes.

7. The method of claim 2, further comprising reducing the support.

8. The method of claim 7, wherein the reducing comprises contacting the support with hydrazine after the seeding.

9. The method of claim 8, wherein the contacting is conducted for about 20 minutes at about 50° C.

10. The method of claim 1, wherein the support is a stainless steel support.

11. The method of claim 10, wherein the support is a mirror-finished stainless steel support.

12. The method of claim 1, wherein the electroless plating comprises immersing the support in a palladium plating bath.

13. The method of claim 12, wherein the palladium plating bath contains no ethylenediaminetetraacetic (EDTA).

14. The method of claim 1, wherein the electroless plating comprises immersing the support in a palladium plating bath at about 50° C.; and, adding hydrazine to the plating bath.

15. The method of claim 14, wherein the hydrazine is a 3M solution of hydrazine added to the plating solution in a 100:1 ratio of plating bath to hydrazine.

16. The method of claim 1, wherein the removing comprises scoring the edge of the palladium film and lifting the film away from the support.

17. The method of claim 1, further comprising electroless plating of a second metal onto the palladium membrane to form a layered metal membrane before the removing.

18. The method of claim 17, wherein the second metal is selected from the group consisting of copper, silver and gold.

19. The method of claim 17, further comprising annealing the layered metal membrane prior to the removing.

20. The method of claim 1, wherein the second metal is selected from the group consisting of copper, silver and gold.

* * * * *